UNITED STATES PATENT OFFICE.

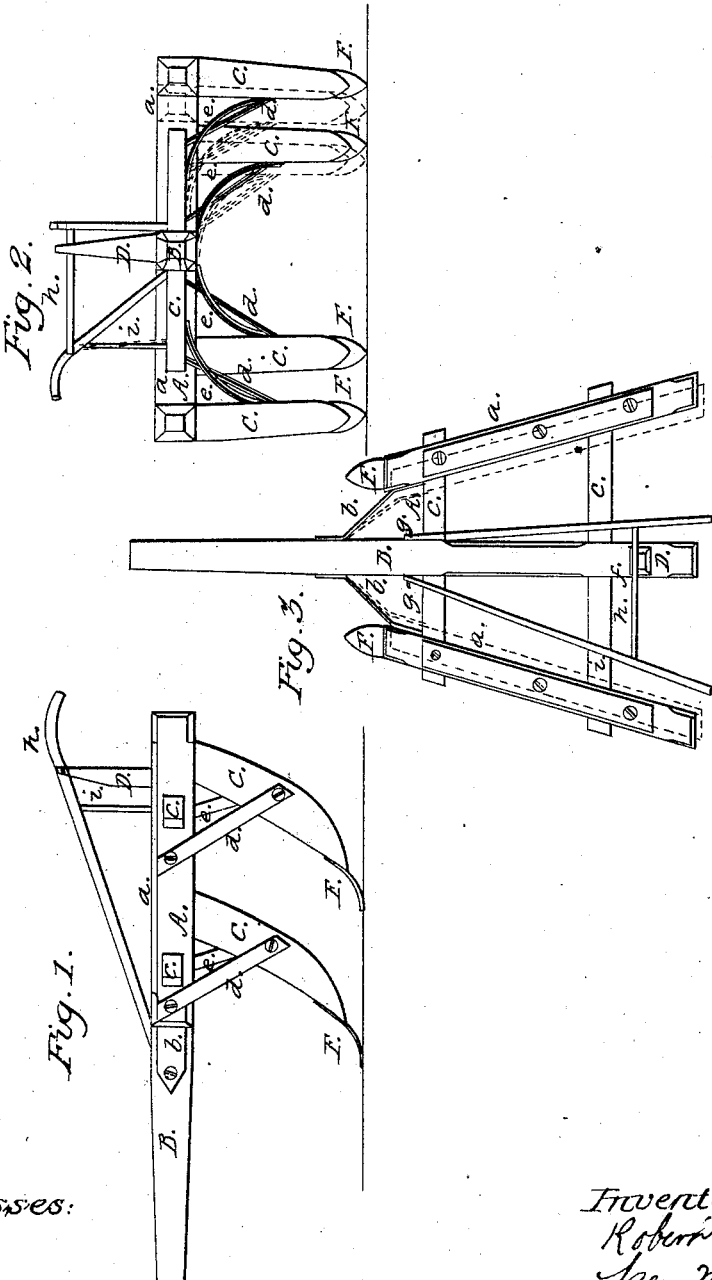

ROBERT RICE, OF GEORGETOWN, ILLINOIS.

IMPROVEMENT IN CULTIVATORS.

Specification forming part of Letters Patent No. 38,337, dated April 28, 1863.

*To all whom it may concern:*

Be it known that I, ROBERT RICE, of Georgetown, in the county of Vermillion and State of Illinois, have invented a new and Improved Cultivator or Cultivator-Plow; and do hereby declare that the following is a full, clear, and exact description of the same, reference being had to the accompanying drawings, making a part of this specification, in which—

Figure 1 is a side view of my invention; Fig. 2, a back view of the same, in elevation; Fig. 3, a plan or top view of the same.

Similar letters of reference indicate corresponding parts in the two figures.

The object of this invention is to obtain a cultivator or cultivator-plow of simple construction, which will be extremely strong and durable and admit of being readily adjusted, so as to suit the width of the spaces between the rows of plants, and also admit of being manipulated or guided with greater facility than those hitherto devised.

To enable those skilled in the art to fully understand and construct my invention, I will proceed to describe it.

A represents the frame of the implement, which is constructed of two bars, $a\ a$, having an oblique position relatively with each other, and connected to a draft-pole, B, by elastic plates $b\ b$, a bar $a$ being at each side of the draft-pole and equidistant from it, as shown in Fig. 3. Two other bars, $c\ c$, are also comprised in the frame, said bars passing transversely through the draft-pole B, and through mortises in the bars $a\ a$. The bars $c\ c$ are permanently secured in the draft-pole by bolts or screws; but the bars $a\ a$ are allowed to move or slide on the bars $c\ c$. To each bar $a\ a$ there are attached two standards, C C, which are inclined, as shown in Fig. 1, and held firmly in position by metal braces $d$, which are attached to both sides of the standards and the bars $a\ a$, and $e$ are curved braces, which are attached at their lower ends to the standards C, and at their upper ends to the under sides of the bars $c\ c$, as shown in Fig. 2.

To the back part of the draft-pole B there is secured an upright, D, which has a notch or shoulder, $f$, near its upper end, and E E are two handles, the front ends of which are connected to the draft-pole B by screws or bolts $g$. The handles are connected near their back ends by a rod, $h$, and they are held in position by an elastic bar, $i$, the upper end of which is attached to one of the handles E, and the lower end to the back cross-bar $c$. To the lower end of each standard C there is attached a shovel-share, F. The shares F of the two bars $a\ a$ are adjusted nearer together or farther apart by detaching the braces $e$ from the bars $c\ c$, and sliding the bars $a\ a$ on the bars $c$ to the desired points, the braces being then secured to the bars $c$. As the implement is drawn along the handles E will yield or give to a certain extent under the movement of the implement, and this yielding movement of the handles is a great relief to the operator or driver, as the concussions or jars of the implement are not transmitted to him, at the same time the handles have a sufficiently firm attachment to admit of the implement being properly controlled or guided by the driver.

In adjusting the bars $a\ a$ on the bars $c\ c$ the plates $b\ b$ yield or give on account of their elasticity, and at the same time they form a firm connection of the bars $a\ a$, there being no play or vibration of the plates $b$ when the bars $a\ a$ are attached to the bars $c\ c$.

The shoulder $f$ of the upright D serves as a support or bearing for the handles E E, and the rod $h$ is allowed to slide freely on said shoulder to admit of the lateral yielding movement of the handles.

Having thus described my invention, what I claim as new, and desire to secure by Letters Patent, is—

1. The connecting of the front ends of the bars $a\ a$ of the implement to the draft-pole B by means of the elastic plates $b\ b$, in combination with the cross-bars $c\ c$, fitted in the draft-pole B, and passing loosely through the bars $a\ a$, and with the braces $e\ e$, attached to the plow-standards C C and the cross-bars $c\ c$, as herein set forth.

2. The handles E E, attached at their front ends to the draft-pole B by means of screws or bolts $g$, in combination with the spring or elastic bar $i$, and the upright D, on which the rod $h$ bears, substantially as and for the purpose herein specified.

ROBERT RICE.

Witnesses:
ARTHUR JACKSON,
JOSIAH THOMPSON.